United States Patent
Kilpatrick et al.

(10) Patent No.: US 8,694,032 B1
(45) Date of Patent: Apr. 8, 2014

(54) SYSTEM AND METHOD FOR IDENTIFYING SMS MESSAGES FROM MULTIPLE ORIGINATORS USING A SHARED SHORTCODE

(75) Inventors: Joshua Kilpatrick, Seattle, WA (US); Cindy Nelson, Spanish Fort, AL (US); Danny J. Thrash, Spanish Fort, AL (US); Baron Morvant, Mobile, AL (US)

(73) Assignee: West Corporation, Omaha, NE (US)

( * ) Notice: Subject to any disclaimer, the term of this patent is extended or adjusted under 35 U.S.C. 154(b) by 238 days.

(21) Appl. No.: 13/359,756

(22) Filed: Jan. 27, 2012

(51) Int. Cl.
*H04W 4/00* (2009.01)

(52) U.S. Cl.
USPC ........ 455/466; 455/414.1; 455/518; 455/521; 370/351; 370/352; 370/389; 370/390; 370/392; 370/396; 370/312; 709/201; 709/202; 709/217; 709/238; 709/245

(58) Field of Classification Search
USPC .............. 455/466, 412.2, 414.1, 518, 521; 370/312, 351, 352, 389, 390, 392, 396; 709/201, 202, 217, 218, 210, 238, 245
See application file for complete search history.

(56) References Cited

U.S. PATENT DOCUMENTS

| | | | | |
|---|---|---|---|---|
| 7,546,131 B1 * | 6/2009 | Sidi et al. | ........................ | 455/466 |
| 7,649,895 B2 * | 1/2010 | Kadar et al. | ................... | 370/396 |
| 7,676,235 B2 * | 3/2010 | Coelho | ......................... | 455/466 |
| 7,873,376 B2 * | 1/2011 | Coelho | ......................... | 455/466 |
| 8,244,285 B2 * | 8/2012 | Mendiola et al. | ............. | 455/466 |
| 2006/0199597 A1 * | 9/2006 | Wright | ........................... | 455/466 |
| 2007/0050510 A1 * | 3/2007 | Jiang | ............................. | 709/227 |
| 2009/0247133 A1 * | 10/2009 | Holmen et al. | ............ | 455/414.1 |
| 2013/0157699 A1 * | 6/2013 | Talwar et al. | ................. | 455/466 |

* cited by examiner

*Primary Examiner* — Olumide T Ajibade Akonai (57) ABSTRACT

To enable multiple message originators to share an SMS shortcode, originator identifying codes can be added to outbound SMS messages that prompt recipients to respond with response messages that include the originator identifying codes. The originator identifying codes can be added by a service provider that administers the SMS shortcode. When a response message is received on the SMS shortcode number, the service provider processes the response message content to extract the originator identifying code. The code and, optionally, a recipient ID can be used as a lookup to determine the intended originator that the response message is for. The response message can then be associated by the service provider with the correct originator for subsequent processing.

17 Claims, 8 Drawing Sheets

| SmartText Parameters | |
|---|---|
| SmartText Parameters | |
| 71 — Short Code: | 622622 TeleVox SmartText ▼ |
| 72 — Organization Key: | DermInstitute [Check Availability] |
| 73 — Organization Name: | Dermatology Institute & Skin Care |
| 74 — Frequency Limit: | 15 ▲▼ Messages Per Week ▼   ☐ Internal Use Only |
| 75 — Program Description: | Derm Institute Alerts |
| 76 — SMS Branding: | ⊙ TeleVox SmartText   ○ Organization Key   ○ Organization Name |
| | TeleVox SmartText:   Characters Remaining: 1 |
| 77 — Opt-In Confirmation: | You are opted into DermInstitute txts |
| | MsgFreqPerAcctSetup. Reply HELP for help/txt.tvox.com. Reply STOP to cancel. Msg&Data rates may apply. |
| | [Save] [Exit] |

SYSTEM AND METHOD FOR IDENTIFYING SMS MESSAGES FROM MULTIPLE ORIGINATORS USING A SHARED SHORTCODE

FIELD OF THE INVENTION

This disclosure relates to providing SMS messaging services to recipients.

BACKGROUND OF THE INVENTION

The Mobile Phone industry developed an extremely popular service in the early 1990's known as the Short Message Service (SMS). Since that time the use of SMS messages, also known as mobile text messages, among consumers has boomed in popularity. Businesses and organizations interested in utilizing SMS messages to communicate with consumers face a number of obstacles. First, the mobile phone industry and federal and state regulations enforce extensive rules around managing consent. No business can send SMS messages to a consumer without their express consent. Second, the technological options available for delivering SMS messages from computer networks are limited to informal e-mail (Simple Mail Transfer Protocol—SMTP) gateways maintained by mobile phone companies and more formal Short Message Peer to Peer Protocol (SMPP) gateways. The informal SMTP gateways offer simple delivery but are not intended for use by businesses. Because of this, businesses that rely on SMTP gateways may experience blocking by the mobile phone company if their use is discovered. The SMTP gateways do not provide reliable delivery and offer no confirmation that messages were delivered. The SMPP gateway is the preferred means for businesses to deliver SMS messages to consumers, but utilizing these gateways requires a time consuming and expensive registration process. Businesses desiring to utilize such delivery mechanism must purchase a registered shortcode which costs between $6,000 and $12,000 per year. In addition to these fees, businesses must undergo a lengthy and costly certification process with each major mobile phone company to verify that their planned use of the shortcode conforms to best practices for ensuring consumer satisfaction and avoiding unwanted messages.

The constraints surrounding effective use of SMS messages to communicate with consumers deter many businesses and healthcare organizations from using this method of message delivery.

What is required is a system and method that facilitates providing SMS based services to customers of a business.

SUMMARY OF THE INVENTION

To enable multiple message originators to share an SMS shortcode, originator identifying codes can be added to outbound SMS messages that prompt recipients to respond with response messages that include the originator identifying codes. The originator identifying codes can be added by a service provider that administers the SMS shortcode. When a response message is received on the SMS shortcode number, the service provider processes the response message content to extract the originator identifying code. The code and, optionally, a recipient ID can be used as a lookup to determine the intended originator that the response message is for. The response message can then be associated by the service provider with the correct originator for subsequent processing.

In one aspect of the disclosure, there is provided a method for communicating between a plurality of message originators and a plurality of recipients by Short Message Service (SMS) using a shared SMS shortcode. The method may comprise adding an originator identifying code to message content of an outbound message, the message content prompting a recipient to respond with response message content that includes the originator identifying code, transmitting the outbound message to at least one of the plurality of recipients, a sender identity of the outbound message comprising the shared SMS shortcode, receiving an inbound response message from a recipient on the shared SMS shortcode, processing content of the inbound response message to extract an originator identifying code, and determining an intended originator for the inbound response message from the originator identifying code.

In one aspect of the disclosure, there is provided a system comprising a service provider that provides outbound SMS messaging services for a plurality of originators using a shared shortcode, and one or more originator computer systems programmed to provide an outbound message request to the service provider, the outbound message request comprising a message template identifier. The service provider comprises one or more computer systems programmed to receive an outbound SMS message request from one or more of the originators, compile an outbound SMS message using a message template associated with the message template identifier of the outbound SMS message request, determine from the message template identifier of the outbound message request whether the outbound SMS message associated with the message template identifier solicits a response, and transmitting the outbound message to at least one recipient identified in the outbound message request, wherein a sending identity of a transmitted outbound SMS message is the shared shortcode. When the outbound SMS message associated with the message template identifier solicits a response, the service provider may add an originator identifying code to message content of the outbound SMS message such that the message content prompts a recipient to respond with response message content that includes the originator identifying code.

In one aspect of the disclosure, there is provided a non-transitory computer readable medium comprising instructions for receiving message content of an outbound SMS message from one of a plurality of message originators that share an SMS shortcode, determining if the message content solicits a response and adding an originator identifying code to the message content if the message content solicits a response.

BRIEF DESCRIPTION OF THE DRAWINGS

Reference will now be made, by way of example only, to specific embodiments and to the accompanying drawings in which.

DETAILED DESCRIPTION OF THE INVENTION

The present disclosure will describe by various embodiments, a system and method that allows multiple businesses and organizations to share a common SMS shortcode and to utilize a common but flexible messaging structure that satisfies the operating and certification requirements of major US mobile phone companies.

Figure 1:
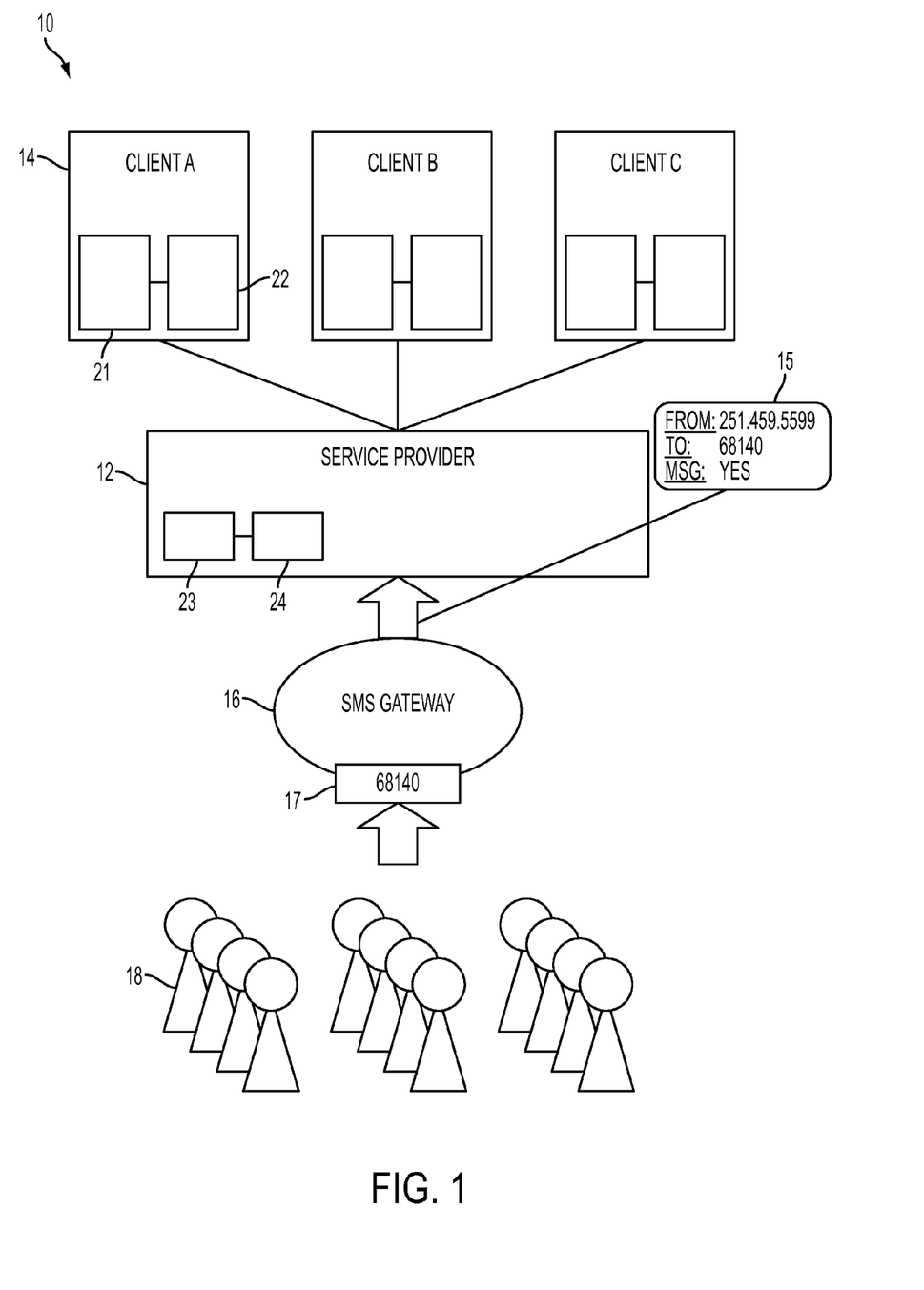
FIG. 1 depicts a system for providing SMS message services using a shared shortcode.

In FIG. 1, there is shown a schematic of a system for providing shared common short code services. A service provider 12 provides messaging services to multiple clients 14 illustrated as Client A, Client B and Client C. The service provider 12 administers an SMS shortcode 17 using which the service provider 12 can send and receive SMS messages via an SMS gateway 16 to users 18. The clients are termed clients because they may be clients of the service provider 12. More generally, the clients may be considered as originators of SMS messaging services.

Figure 2:
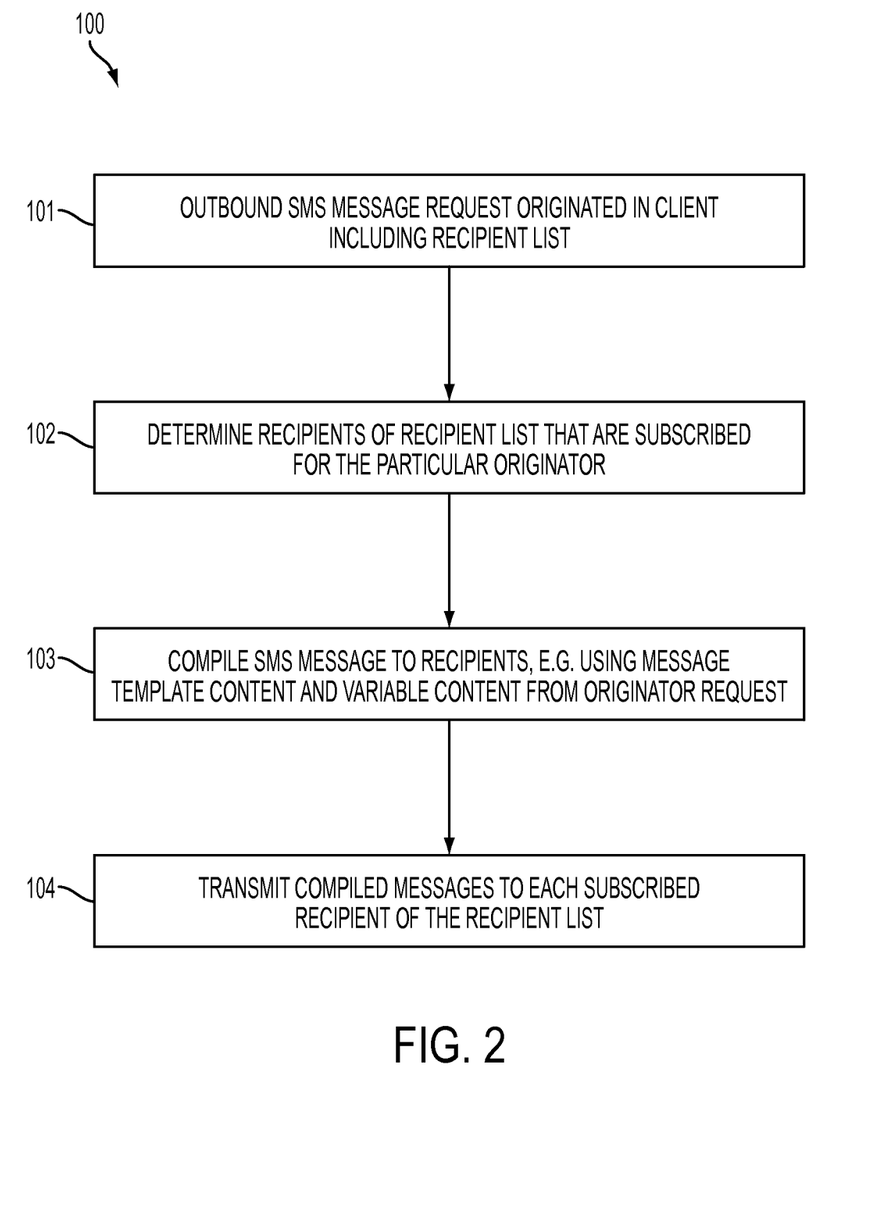
FIG. 2 depicts a method for providing SMS messages using a shared shortcode.

A method for providing SMS services from a plurality of clients (originators) to a plurality of recipients 18 using a shared shortcode is depicted in the flowchart 100 of FIG. 2. At step 101, a particular client or originator originates an outbound SMS message request. The message may be originated using application software executing in a computer system of the particular client. The computer system of a client may include one or more processors 21 and one or more memories 22 operatively associated with the processor 21. The memory 22 may include a memory that stores the application code for execution by the processor 21. The memory 22 may also comprise a database memory that stores details of the customers of the clients, in particular mobile number contact details and, optionally, whether or not a customer has opted in to receive SMS messaging services from the client. The SMS message generated by the client 14 may be automatically generated based on one or more settings or preferences in the client customer database. For example, a customer may have a preference setting to receive reminders about upcoming appointments with the client. The application code may automatically determine when a reminder should be sent to the customer and generate a reminder SMS accordingly. In a further example, a survey question could be automatically or manually generated by the client systems and sent to multiple customers of a client, e.g. all those customers who recently had an appointment with the client.

In generating the SMS message request, the client also generates a recipient list to receive the SMS message. The recipient list will have at least one recipient but may have many recipients. The client then transmits the SMS message request including the recipient list to the service provider 12 using some suitable communications protocol, typically an internet protocol. Mechanisms for generating and transmitting messages from the client to the service provider will be described in detail below.

The service provider 12 has its own processor 23 and memory 24 and runs its own application code so that when the service provider 12 receives an SMS message request, the service provider 12 processes the recipient list for the SMS message request to ensure that each intended recipient of the outbound SMS message has opted in to receive SMS messages from the particular client (step 102). The service provider 12 may advise the client 14 of any recipients that have not opted in for the SMS message service so that the intended recipient can be contacted by alternative means. The service provider 12 then compiles SMS messages for each subscribed recipient of the recipient list (step 103). For example, the service provider may combine standard message content with variable message content provided by the client in the message request. The service provider then sends the compiled SMS messages of the client to the vetted recipients on the recipient list via the SMS gateway (step 104) using the shared SMS shortcode as the SMS sender identity.

How the outbound message request is generated in the client may be dependent on the type of messages and/or the type of services the client provides to its customers, as well as other factors. For example, for appointment reminders, the request may be generated automatically by an appointment management software of the client data systems 21, 22. The appointment system may be programmed to send reminders at a configurable lead interval, e.g. one day, two days, one week etc. prior to a person's appointment. Periodically, e.g. daily, the appointment management software may process the appointments database of the client to determine the appointments for which reminders need to be sent. The reminder list extracted from the client database may include recipient IDs, including SMS phone numbers.

The recipient list may be extracted from the client database in a format required for processing in the computer systems of the service provider. Client, recipient and/or message specific variables may also be extracted from the client database and included in the outbound message request to the service provider for message compiling by the service provider.

The client database may or may not store whether an intended recipient, i.e. someone to whom an SMS message is to be sent, is a subscriber to SMS messaging services of the client. If the client database does store subscriber information, the client computer systems are able to pre-filter the recipient list prior to sending the message request to the service provider.

The outbound SMS message request may be provided to from the client to the service provider in a variety of means, including, without limitation, manually, via email, vieweb upload initiated by a person at the client and by automatic upload from the client to the service provider.

Figure 3:
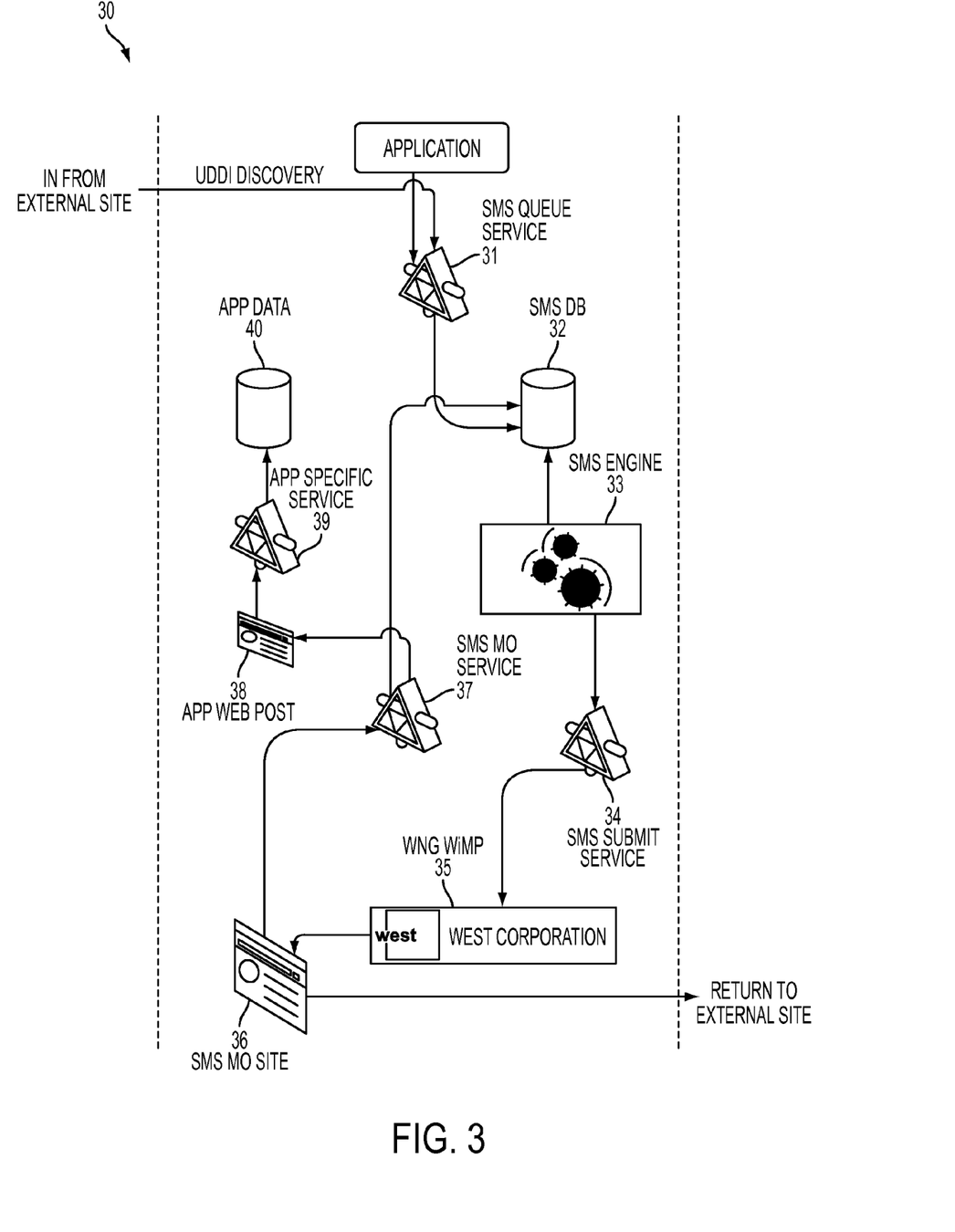
FIG. 3 depicts a system platform design.

An embodiment of an SMS platform 30 is depicted in FIG. 3. The platform 30 includes an SMS Queue Service 31, an SMS database 32, SMS Engine 33, SMS Submit Service 34, Aggregator 35, SMS MO Site SMS Queue Service 31—a service that exposes the API to connect proprietary applications both internal and external to the datacenter hosting the SMS platform. This API includes methods to view and modify message templates, application mappings, and organization keys. In addition the SMS Queue Service 31 provides the methods for submitting outbound SMS messages from the proprietary applications to the SMS DB 32 for processing. The SMS Queue service 31 may be a single server or may be load balanced across multiple servers.

SMS DB 32—Main SMS database which may be hosted on a clustered SQL Server resource. This database is replicated to a secondary site to provide the ability to do a 'hot swap' in the event of a failure.

SMS Engine 33—The SMS Engine is a multithreaded process that runs within a Windows Communication Foundation (WCF) service or similar Web Service which may be hosted by a Windows Service on the application tier. The number of threads and the number of servers running this engine are configurable for scalability. The SMS engine 33 may consist of an operation scheduler that is responsible for querying the SMS DB 32 for messages, and multiple operation threads that process any qualifying messages as determined by the operation scheduler. Qualifying messages are those that meet the criteria to be sent to mobile devices based on valid start and end times and expiration time associated with the message when created via the SMS Queue Service.

SMS Submit Service 34—WCF Service (load balanced across multiple servers) exposes the API which is responsible for formatting outbound SMS messages into the proper data contract as defined by the third party SMS aggregator 35. Messages matching the predefined contract are then posted to the aggregator. The SMS Submit Service 34 uses a factory pattern to allow the service to be able to support multiple data contracts and message delivery methods as required by any aggregator use to send SMS messages. In addition, any merge elements associated with the organization key associated with the outbound message are applied/appended to the message before being submitted. Any messages that are expecting a qualified response, are assigned a ReceiveResponse placeholder ID (incremented based on the number of pending responses) in order to allow multiple unanswered messages to be pending for a given device across organization keys.

Aggregator 35—in one embodiment, the platform supports the WNG WiMP aggregator 35 by West Corporation, though as mentioned above, the SMS platform can be enhanced to support any aggregator as long as it supports the base implementation methods.

SMS MO Site 36—load balanced ASP.Net website hosted in IIS which will accept an HTTP Post containing the MO message as provided by the aggregator 35. This site simply formats the inbound message into a common data contract that can then be passed and processed by the SMS MO Service 37. The SMS MO Site 36 is also responsible for sending a response back to the mobile device as a receipt confirmation of the inbound message. The API exposed by the SMS Submit Service 34 is consumed to perform this action.

SMS MO Service 37—load balanced WCF service that exposes the API needed to process inbound messages. The inbound message is parsed to determine the organization key for which the inbound message is intended. If the response for an organization key is determined to a qualified response, the ReceiveResponse record is located and the inbound message is then related to the original outbound message. Once the qualified response is determined and the message mapped to the original outbound message, the SMS MO Service 37 will post the results back to the application via an HTTP post to a URI configured for the registered application. When an active organization key is extracted from a message, the SMS MO Service 37 will opt-in the device associated with the inbound message to the shared short code and organization.

App Web Post 38—Proprietary web site which processes the HTTP post sent by the SMS MO Service 37.

App Specific Service 39—Proprietary application SOA service (optional).

App Data 40—Database for proprietary application.

A shortcode 17 may be registered with an administration and registration authority such as the Common Short Code Administration (CSCA). As described above, it can be necessary to include a certification process that ensures that the shortcode will be used in accordance with the requirements of the shortcode registration authority. The service provider 12 provides a flexible messaging structure that can be used by many clients 14 in a manner that satisfies the requirements of the certification requirements and the operating requirements of the major US phone companies. In one embodiment, the basic structure of service provider 12 allows businesses and organizations to send text messages to their customers and members in one of three forms. (1) Messages that are one-way and do not solicit a response. (2) Messages that solicit a simple response, e.g. "YES/NO". (3) Messages that solicit an open ended response. The deterministic but flexible message structure allows for a multitude of uses including reminding patients or customers about appointments, reminding customers about account balances that are due, sending a simple one-question survey, or collecting open feedback about a topic. Details of these message forms will be described below.

The service provider 12 provides a mechanism that allows many businesses and organizations 14 to share a shortcode and that allows users 18 to subscribe to receive messages from one or more businesses or organizations. Clients 14 using the system to deliver messages provide an opt-in process to their customers. An embodiment of the opt-in process is depicted in the flowchart 200 of FIG. 4. At step 201, the client selects an opt-in keyword that is unique to the client and then advertises the opt-in keyword together with the shared shortcode to their customers or members as a way to opt-in for communications (step 202). The opt-in keyword provides a label that uniquely identifies the client from other clients of the system 10. The opt-in keyword may be advertised to prospective customers through various channels e.g. website, phone, face to face consultation and questionnaire or in a one-off SMS message.

Figure 4:
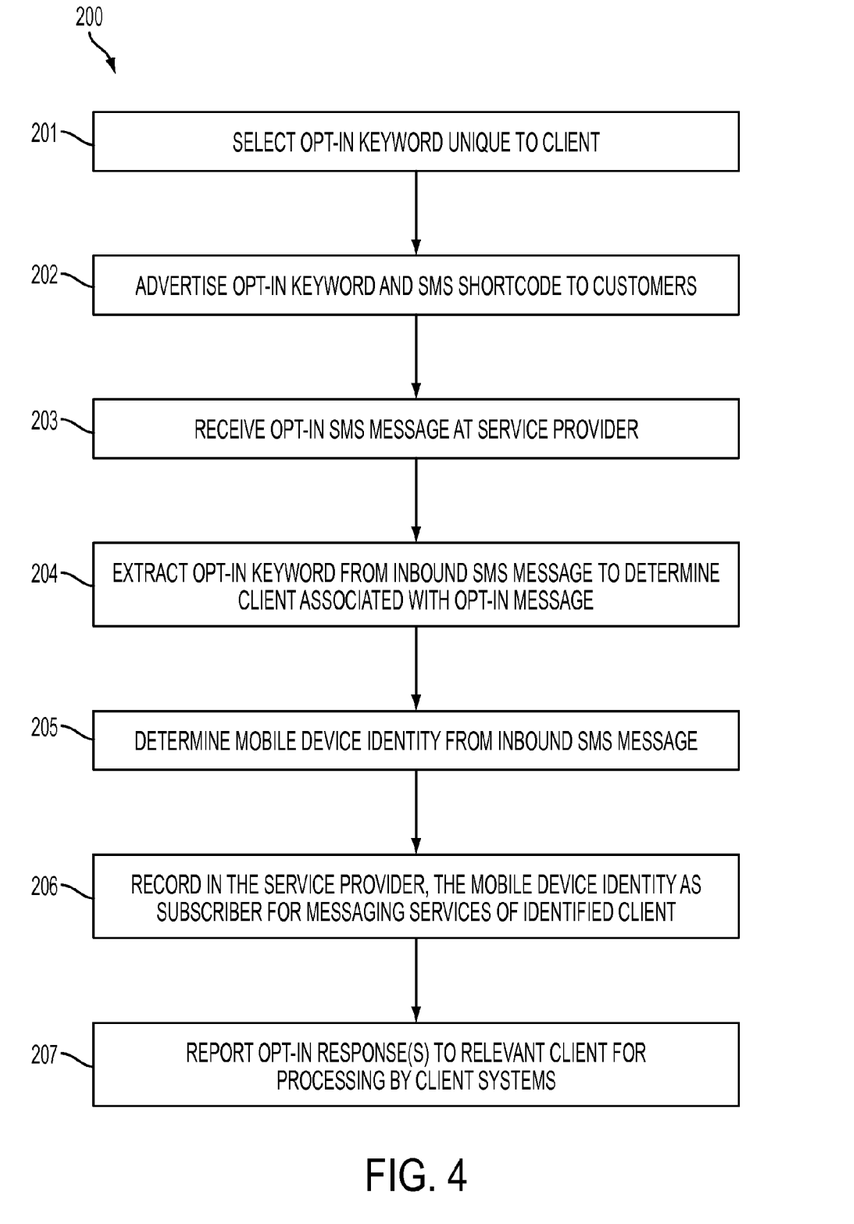
FIG. 4 depicts an opt-in process for SMS message services.

Customers opt-in by sending the opt-in keyword in the content of a text message to the shortcode number. The term "content" as used herein is intended to signify user input of a message that forms the message, e.g. within the 160 characters per single SMS message, as distinct from other data of the message such as the sender ID of the mobile device, date and time of message, etc. The service provider 12 receives an opt-in message from the customer (step 203) via the SMS gateway 16. Application code of the service provider 12 processes the content of the opt-in message to extract the opt-in keyword, thereby ascertaining the client that is associated with the opt-in message (step 204). The service provider also determines the mobile device identity of the customer from the opt-in message (step 205). The service provider 12 is then able to record the customer, e.g. in a database of the service provider 12, as a subscriber of messaging services for the client identified by the opt-in keyword (step 206). The service provider 12 may then report the opt-in response(s) to the particular client so that the client 14 may also record the customer as a subscriber of the SMS messaging services. The service provider 12 may include a single database that stores subscribers for all of the clients or may have specific client dedicated databases. Other database arrangements will be apparent to a person skilled in the art.

Participating clients 14 can then mass broadcast messages to their members or customers without fear of delivering unwanted text messages since the mechanisms and applications of the service provider 12 will guarantee that only those mobile numbers which subscribed for messages from the given business or organization will receive SMS messages.

As described above, the system 10 provides messaging structures in various forms including outbound messages that solicit a response. Since the system 10 allows many clients to share and utilize a shared shortcode, the system 10 must be configured to determine which client an inbound message is intended for. To understand why this is so, it is important to note that the SMS system of mobile phone networks maintains no history of messages. If a subscriber receives a message on their mobile phone and replies to that message, the message is returned to the original sender, but the only information transmitted back to the sender is the mobile number from which the message was sent, the mobile number or shortcode to which the messages is destined, and the message contents. To solve the problem of matching inbound messages to their intended recipients (i.e. the clients 14), a two part solution is provided to handle responses that are simple YES/NO responses as well as responses that are open.

Figure 5:
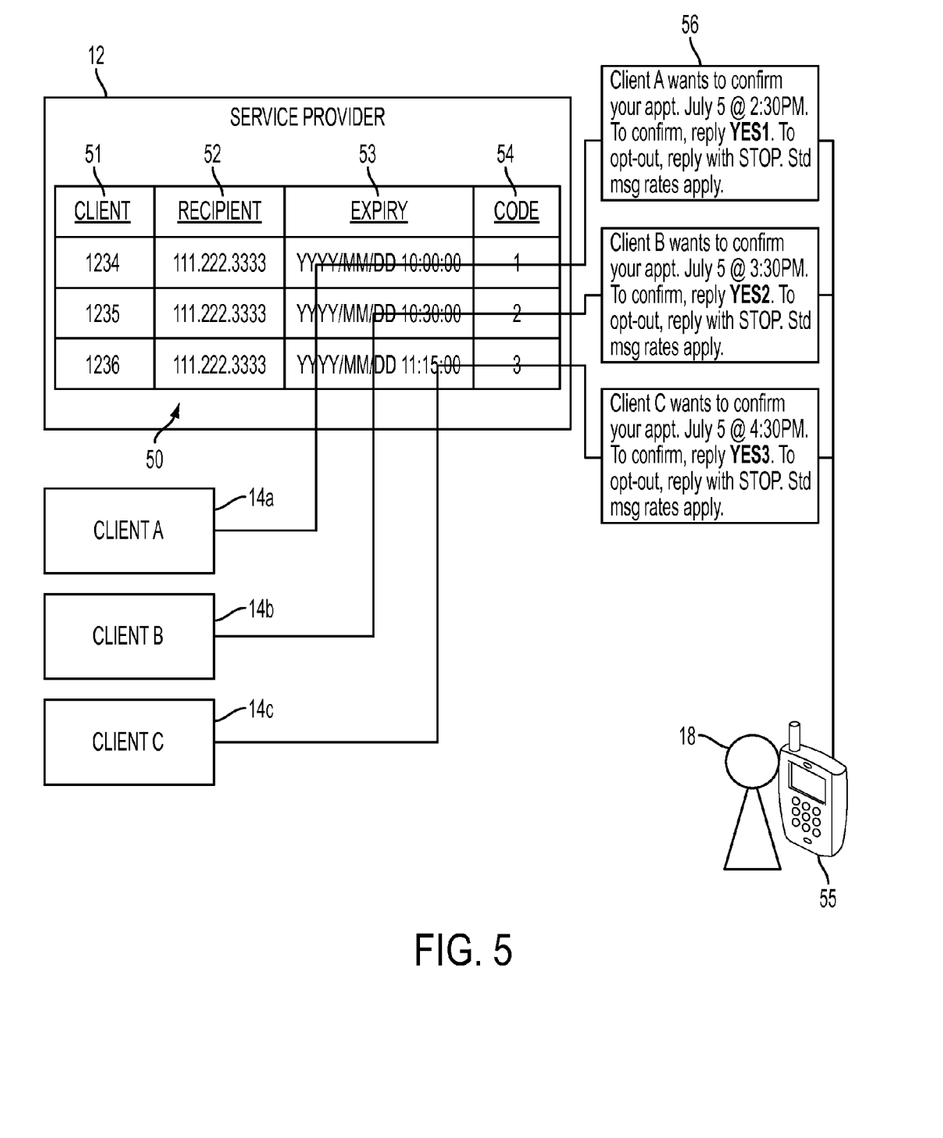
FIG. 5 depicts a system for providing SMS messages that solicit a simple response.

In one embodiment, the system 10 manages basic response messages such as YES/NO responses by ensuring that all outbound messages sent to the same mobile phone number soliciting a YES/NO response are altered to request a unique response that can be matched to the intended client 14. A system for handling simple responses is depicted in FIG. 5.

The system tracks all outbound messages from all originators. Each originator "pre-configures" the messages they plan to deliver by way of message temples which may be stored at the service provider. Only some limited variables of the message can be altered for each individual recipient. Based on the pre-configured message structure, each potential out-bound message from an originator is identified as soliciting a yes/no response, an open response, or no response. Each message is tracked based on the recipient phone number. When an inbound message originates from that phone number, it is checked against the list of outbound messages to find a match. If more than one "yes/no" message was delivered to the same recipient, the response is matched based on a special number at the end of the yes/no response. That number is entered by the sender because they were prompted to do so. For instance, the second yes/no message delivered to a recipient would read "reply 'yes2' or 'no2'"

The service provider receives an outbound message request from the client and modifies the compilation of the content of the message to add a request for a unique response depending on the state of a message table, as will be described below. Unique responses may be requested by requesting the recipient to respond with the word "YES" or "NO" suffixed with a unique number that enables the system to identify the outbound message that a response should be associated with. Each active outbound message which solicits a response may be held in a message table 50 in the service provider 12 and flagged as waiting for a response. The service provider 12 automatically adds an identifier to the message contents of an outbound message that requests that the recipient include the identifier in the response.

As responses are received from the recipients by the service provider, the service provider 12 matches the entries in the message table 50 with their responses by matching the unique suffix codes extracted from the content of the response message. A maximum wait time is also enforced so that messages which do not receive a response in a reasonable amount of time are discarded so as not to influence the calculation of future suffix codes.

In the example depicted in FIG. 5, three unique clients, Client A 14a, Client B 14b, Client C 14c, attempt to send an SMS message soliciting a YES/NO response to the same mobile phone 55 of user 18. The phone number of mobile phone 55 is identified as 111.222.3333. The message table 50 only shows entries for recipient 111.222.3333. However, more generally, the message table would also contain similar entries for other recipients.

Each of the clients 14a, 14b, 14c send their message requests to the service provider 12. The service provider 12 compiles the outbound messages using stored message templates and variable data provided in the request from the client. In compiling the messages, the service provider adds response codes and stored details of the outbound messages in the message table 50. For each outbound message, the message table 50 identifies the sending client 51, the recipient 52, a response expiry timeframe 53 and a client identifying code or label 54. Initially, the service provider 12 receives the first message, say, from Client A 14a. The service provider 12, compiles the message including a response code and adds the details of the message to the message table 50 including the client ID "1234", the recipient ID "111.222.3333", an expiry time frame "yyyy/mm/dd hh:mm:ss" and a code "1".

In compiling the message, the service provider modifies the content of the outbound message 56. Instead of the message 56 stating "To confirm, reply YES", the message 56 is modified to state "To confirm, reply YES1". That is, the client identifying code "1" is added to the solicited response "YES".

The message thus solicits a "YES1" response that can be used to match any response message to the particular client via the message table 50. Once the message has been compiled with the response code, the message is sent from the service provider 12 to each recipient via the SMS gateway 16.

The service provider 12 repeats the above process when each of the outbound messages are received from Client B 14b and Client C 14c.

In the embodiment depicted, the unique code is added as a suffix, though the code could also be solicited as a prefix or elsewhere in the response message.

The added code may be unique to the client so that all messages from that client solicit a response containing that particular client code, regardless of the recipient.

Alternatively, the added code may be unique to the client/message combination. This enables the client, e.g. Client A 14a, to have two or more pending messages to the same recipient so that the service provider and/or the client is able to ascertain which of the two or more messages the recipient 18 is responding to.

The client identifying code may be a dedicated code so that only a single code, or a single set of codes, is used by the service provider for identifying messages of a particular client, irrespective of the intended recipient. Alternatively, the client identifying code may be generated on the fly for each message and/or may depend on entries already existing in the message table 50. For example, while code "1" is assigned to Client A 14a, being the first client to send a message to the recipient 55, at some later time, code "1" may be assigned to Client B 14b for a message to recipient 55 if there is no other entry in the message table 50 for the intended recipient 55 of a message.

The client code may be consistent for each recipient of a message so that all of Client A's recipients will receive the same modified message soliciting a "YES1" response. Alternatively, the client code may be determined by the service provider 12 on a per recipient basis depending on the contents of the message table 50. For example, Recipient_1 may receive messages from Client A and Client B with solicited responses of "YES1" and "YES2" respectively. Recipient_2 on the other hand may receive messages from Client B and Client C with solicited responses of "YES1" and "YES2" respectively so that, with regard to Recipient_1, code "1" is associated with Client A and with regard to Recipient_2, code "1" is associated with Client B.

One advantage of providing response codes on a per recipient basis is that the codes only need to be provided for second and subsequent pending response messages, i.e. only when there is an existing pending response for that recipient in the message table 50. This scenario maximizes the number of cases where a recipient can respond with only yes/no as "yes1 and no1" or "yes2 and no2" may seem unnatural. If the likely number of messages to a recipient is likely to be low, then it becomes unlikely that multiple originators would be communicating with the same recipients in the same short time frame, as determined by the amount of time that unanswered messages are allowed to linger in the message table. One disadvantage of this arrangement is that if a user forgets to include the response code in their message, e.g. responds with "YES" instead of "YES2", the response will be wrongly attributed to the first message instead of the second message.

Figure 6:
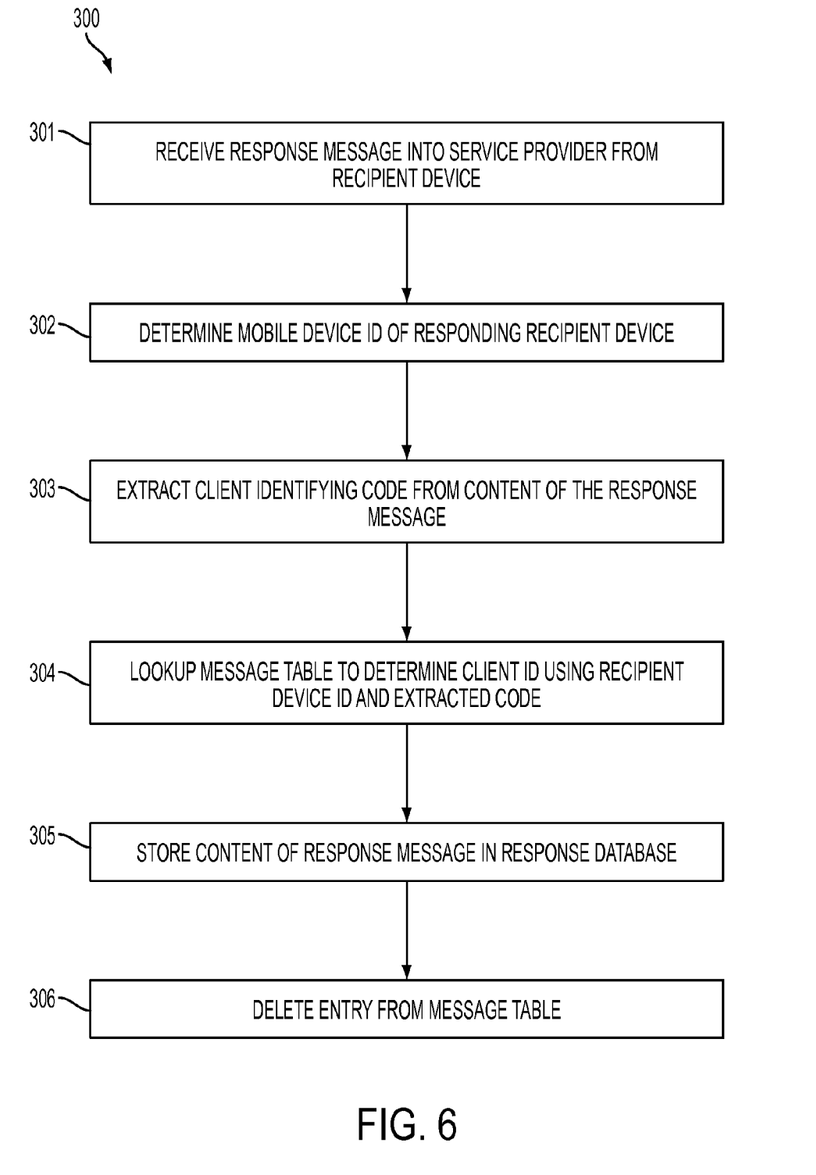
FIG. 6 depicts a process for receiving response messages.

A process for receiving and processing a response message from the recipient device 55 is depicted in the flowchart 300 of FIG. 6. At step 301, the service provider 12 receives a response message via the SMS gateway 16. At step 302, the service provider 12 determines the identity of the mobile device 55 that sent the response message and then processes the content of the response message to extract the client identifying code portion (step 303). The service provider then uses the recipient ID and the code as a lookup to the message table 50 to determine the client field 51 that identifies the intended client for the response message (step 304). For example, if the recipient 55 were to send a message to the service provider 12 with the message contents "YES2", the service provider 12 would extract the "2" code from the message and then use the "2" code and the recipient ID from the response to determine that client 1235 is the intended recipient of the response. At step 305, the service provider 12 stores the response "YES" as a record in the database 32. Later the client may use reporting to view responses. A reporting system (not shown) allows detailed view of all responses and statistical reporting by the clients. Because a response has been received for a particular client code and recipient ID combination, the corresponding entry of the message table may then be deleted (step 306)

The expiry timeframe 57 may be a configurable parameter that is set by the service provider 12 and/or the specific client 51, 52, 53. In one embodiment, the expiry timeframe may be calculated from an allowable messaging rate under the agreement of the shortcode certification. Though not depicted in FIG. 5, the message contents 56 may also indicate the expiry timeframe 53 for a message.

At various times, the service provider 12 may process the message table 50 to remove entries that have exceeded the expiry time. The cleanup may be performed periodically, e.g. daily, or may be performed when a new message is received from a particular client to expunge old message entries from the message table and to enable new entries to be made for that client, including re-using the client codes.

While the example described relates to simple YES/NO responses, a person skilled in the art will readily recognize that other examples of fixed responses are conceivable and all such fixed or closed response types are considered to be encompassed herein.

In one embodiment, the service provider 12 may add the client identifying code to each outbound message to a recipient that solicits a simple response. Because it may only be difficult to correlate inbound responses with clients where multiple clients are simultaneously awaiting a response from a recipient, in an alternative embodiment, the identifying code may only be added to an outbound message if there is an existing client awaiting a response. In such an embodiment, the service provider 12 may process the recipient list of an outbound message to ascertain if any of the recipients have an existing entry in the message table 50. If an entry exists in the message table for a particular recipient, the service provider adds the client identifying label to the outbound message for that recipient.

The second form of message response that is supported is the open ended message. Since any client can send an outbound message to their customers or members soliciting an open response, the system needs a mechanism to match free-form responses to clients.

Clients that wish to receive free form responses generate outbound SMS messages that solicit the recipient to incorporate a client identifying code into the content of a response message in a deterministic manner. For example, an outbound response message can solicit an inbound response that includes a client identifying code as a prefix to any other message content. The client identifying code can be a unique client code such as the client's opt-in keyword.

By including the client code as a prefix, the service provider 12 can search for and extract the client code from the response, ascertain the client, and forward the actual response content to the client for processing by the client's own systems.

A client 14 may generate the outbound SMS messages using a message builder application offered as a service by the service provider 12. The message builder operates within the datacenter of the service provider and is used to craft "message templates" that will be used by the client. Client's may develop one or more message templates, each having a number of variable fields that are populated based on variable data provided by the client at delivery time. Each message template is identified as soliciting a yes/no, open, or no response.

The client activates message delivery via a request that specifies the message template code, the intended recipient(s), and all message variable data. The service provider receives the message request from the client, extracts a message template code from the request and then retrieves the message template associated with the message template code from a service provider database. The service provider computer systems then compile the outbound SMS message by adding the variable content from the request message into the allocated fields of the message template. The compilation also involves processing the message table and adding client identifying codes to any response prompts within the message content as required.

Once compiled, the SMS message is ready to be sent to the recipients by the service provider. The variable content may be client specific, message specific and/or recipient specific so that the outbound SMS message compiled by the service provider may in reality be a number of individual SMS messages tailored to each recipient. The singular term "the" used herein in regard to the outbound SMS message is intended to include all the individual SMS messages sent in response to a single SMS message request from the client to the service provider.

Figure 7:
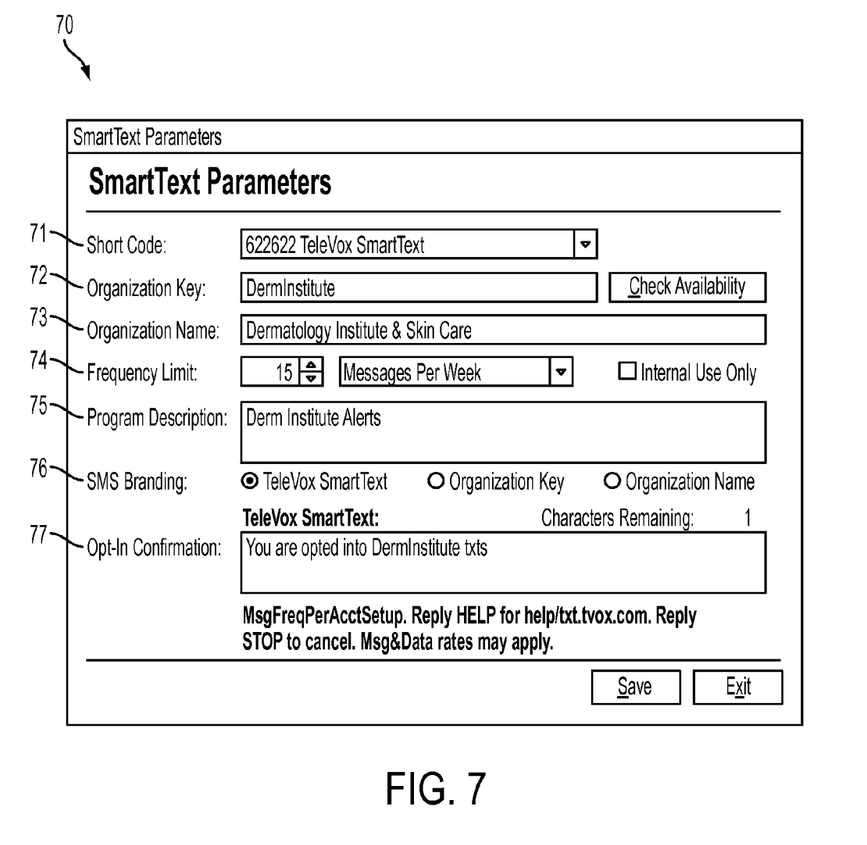
FIG. 7 an interface for configuring an participation invitation for a client.

A specific example of the message builder application will now be discussed, without limitation, with reference to the present Applicant's proprietary system known as SmartText. With reference to FIG. 7, the SmartText Program is a shared-short code program that will enable SMS notifications originating from a business or healthcare organization to the individuals with whom they do business. The service provider, TeleVox, enables multiple clients to utilize the same shared short code 71 by issuing a unique "opt-in" or organization key to each client. Subscribers will opt-in to the code to receive notifications from a particular business or healthcare organization by texting the correct opt-in keyword for that organization.

In FIG. 7, the interface 70 showing the parameters for a particular client organization 73 are shown as including a frequency limit 74 and a Program Description 75 to be used in advertising the program to potential subscribers/recipients. Organizations can elect the branding identity 76 to be used on messages and can also specify an opt-in response message 77 that is returned to recipients that favorably opt-in to the messaging service. Some or all of the parameters shown in the interface 70, including the Organization Key 72, can be used in forming the opt-in message advertised to the recipients as described at step 202 of FIG. 4.

Figure 8:
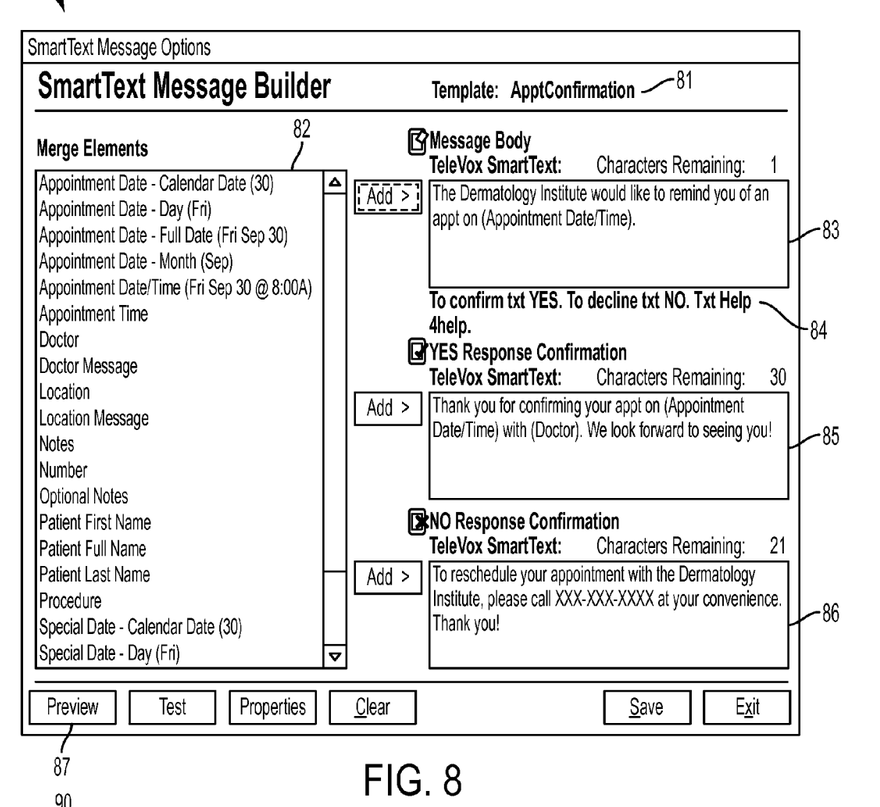
FIG. 8 depicts an interface for configuring client messages.
Figure 9:
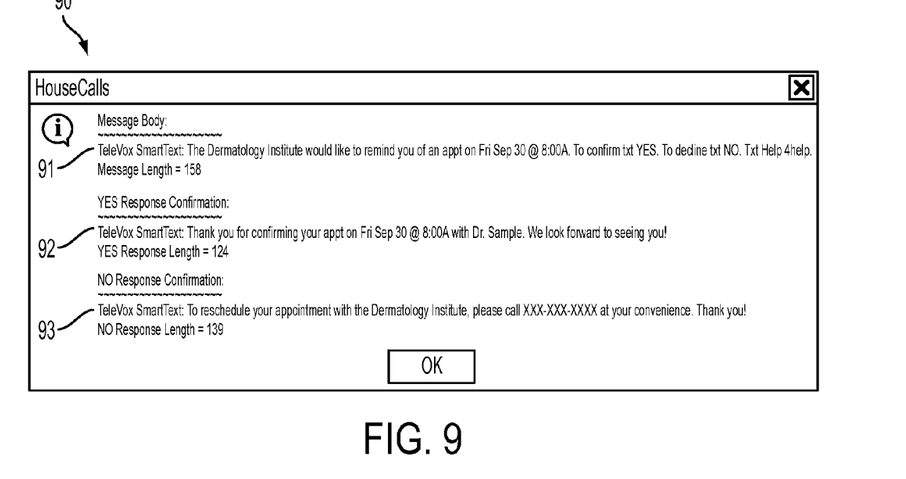
FIG. 9 depicts a display of example messages created with the interface of FIG. 8.

In FIG. 8, there is depicted a message builder interface 80. The notifications supported by the program will serve a variety of uses, but will typically be "customer service" related and will not constitute marketing. Each SmartText message template provides the base structure for the types of messages that will be implemented as well as constructing the qualified responses which embody the message purpose. Clients can configure each message to contain specific elements within the message body and response sections. In the example below of FIG. 8, an ApptConfirmation template 81 is used to structure and build an appointment reminder text message, with the purpose of receiving a YES or NO confirmation from the recipients to confirm or cancel their appointments. The message developer may add variables from a variable list 82 to a SmartText message 83. Fixed text data 84 may include a message describing how a recipient should respond to the message. The message developer may further construct responses to replies received from recipients. In the current example, the message solicits a YES/NO response. A response to a YES reply is created in message box 85 while a response to a NO reply is created in message box 86. By selecting a preview button 87, the message developer may see examples of the created messages in a display 90 as shown in FIG. 9. The display 90 provides examples of the message body 91, the YES Response Confirmation 92 and the NO Response Confirmation 93

The Table below describes an embodiment of an open response flow that may used by the system. Clients can craft their message in a way that the call-to-action prompts the user to respond by prefixing the client's opt-in keyword, referred to below as the "orgkey".

These flows use the following "variables" to describe content. Not all content is used in all message flows.

<orgkey>—A short word (letters or numbers) used by subscribers to opt-in to a client's messaging program. It can also be "merged" into <clientcontent> by the message builder application.

<orgname>—A full name of the client who creates content for the programs of the service provider 12.

<programname>—A short phrase that can be included at the start of every MT message sent by a client. This can be specified to replace a standard label in the client content that denotes the service provider "TeleVox SmartText". It can also be "merged" into <clientcontent> in the message builder.

<programdescription>—A full description of a clients planned use of the shortcode. It may be included on a support web site along with the <orgname> and <orgkey> to describe fully to visitors of the site what the client will be sending.

<frequencylimit>—A setting for how many messages (MAX) will be delivered by the client to any subscriber within a specified time period. It may be reported like "5 msg/wk" when included in an MT message or on the support web site. The support web site will report this value along with the program description. May optionally be rendered as "msg/day" or "msg/month" based on client configuration.

<clientcontent>—This is a general placeholder variable used within the message flow to represent 100% configurable content by the client. This content may contain various "merge variables" supported by the message builder (to include <orgkey> or <programname> as the client chooses.

In the following message flow, the messages are read in chronological order from top to bottom. The 'MT' label means "Mobile Terminated" and labels messages which originate with the client/service provider and are received on the mobile subscriber's device. The 'MO' label means "Mobile Originated" and labels messages which are created by the mobile subscriber and sent to the service provider.

In the following specific examples, the service provider is identified by the label "Televox". Client A is a medical practice that wishes to provide messaging services such as appointment reminders, account alerts, surveys, etc to customers of the medical practice.

| | | Open Response Flow |
|---|---|---|
| 1 | MT (two options) | TeleVox SmartText: <clientcontent>. Txt Help 4help. <programname>: <clientcontent>. Txt Help 4help. |
| 2 | MO | <orgkey> <response> |
| 3 | MT (two options) | TeleVox SmartText: Thank you for your response. Txt Help 4help. <programname>: Thank you for your response. Txt Help 4help. |
| 4 | Example | <orgkey> - CLIENTA <orgname> - Client A Medical Practice <programname> - Client A Alerts <programdescription> - Alerts from Client A. You'll receive appointment reminders 48 hours before all scheduled appointments that allow you to confirm or decline. You'll also get account alerts when portions of your bill are due. <frequencylimit> - 5 msg/mo Example 1: TeleVox SmartText: Client A Medical Practice asks "Were you satisfied with your visit?" Reply like 'CLIENTA bad/fair/good/excellent'. Txt Help 4help. CLIENTA excellent! TeleVox SmartText: Thank you for your response. Txt Help 4help. Example 2: Client A Alerts: Were you satisfied with your visit? Reply bad, fair, good, or excellent. Reply like "CLIENTA good". Txt Help 4help. CLIENTA good Client A Alerts: Thank you for your response. Txt Help 4help. |

In this example, row 1 of the message flow shows two examples of an SMS message that solicits an open response from a recipient. The message content that would be displayed on the recipient device for the first option would be the service provider identity "TeleVox SmartText" followed by the client generated content of the message. For the specific example depicted in row 4, Example 1, the message received on the recipient device is:

"TeleVox SmartText: Client A Medical Practice asks "Were you satisfied with your visit?" Reply like 'CLIENTA bad/fair/good/excellent'. Txt Help 4help."

This message solicits the response of "bad/fair/good/excellent" as suggested examples. The message also solicits that the responder prefix their response with the orgname "CLIENTA".

The second option offered by row 1 replaces the service provider identity with the program name. Example 2 depicts the message displayed on the recipient device. In this case, the recipient is made aware that the message is received under the program "Client A Alerts". The recipient may be able to use this program name to access support features on the service provider website, such as the program description. An example program description is given in row 4 of the above table. Such information may enable the recipient to consider whether to opt out of the program.

When the recipient responds, e.g. using the reply keys of their mobile device, the user is able to craft a message that will be sent to the shortcode that identifies the service provider, i.e. Televox in the above example. The recipient's response is shown in line 2 of the above table in the format <orgkey>, <response>. In example 1 of row 4, the recipient's response is "CLIENTA Excellent!". For example 2, the recipient's response is "CLIENTA good".

In each case, the service provider receives the response message on the shared shortcode. The service provider processes the response to extract the <orgkey> component. Having ascertained that the client to which the response relates is Client A, the service provider 12 is able to forward the response ("Excellent!" for Example 1, "good" for Example 2) to Client A for appropriate processing. Receiving of the response may optionally trigger an automatic response to the recipient, such as a thank you message.

Other unique aspects of the solution are listed below:
Examples of how the system 10 may provide messaging services include, without limitation:
  Notifications with No Required Response
  Preventive HealthCare Education & Follow-Up
  Bill Alerts & Overdue Account Alerts
  Financial Fraud Alerts, Overdraft Alerts, or High Value Transaction Alerts
  Utility Service Impact Alerts (ex. A utility company informing a patron of a planned service interruption)
  Utility Demand Management Alerts (ex. Conservation messages, warnings about peak usage times)
  Delivery Alerts (ex. We plan to make a delivery to your residence tomorrow)
  HealthCare Appointment Reminders (ex. You have an appointment tomorrow at 8:00.)
  Service Appointment Reminders (ex. A technician is schedule to connect your service tomorrow at 4:00 pm.)
  Notifications with Response
  HealthCare and Service Appointment Reminders w/Option to Confirm (reply YES/NO)
  Surveys to Assess Satisfaction, Compliance, or Wishes (reply YES/NO/Other)
  "Did your delivery arrive on time?"
  "Were you satisfied with today's appointment?"
  "How many months ago did you last visit your physician?"
  "Would you like to receive additional information about your insurance plan?"
  Open Ended Survey Questions
  "Do you have any feedback for us concerning your visit?"

The service provider 12 and/or the clients 14 may include processes for handling invalid responses from recipients. For example, if responses do not include valid client identifying codes or include incorrect message formats (e.g. neither a YES or NO for a YES/NO solicited response), the service provider 12 may generate a further message to the recipient that indicates that an invalid response was received and request a further response. The request may re-state the original message, or at least the solicited response.

The presently described embodiments demonstrate a system and method that enable clients to provide enhanced SMS message services to customers using a shared shortcode. The clients therefore do not need to undergo the extensive process of registering and maintaining their own shortcode. Advantages of the system from a user's perspective include that users can opt-in on a per-client basis, so they can elect to receive SMS message services from one client of the short code but can exclude others.

While a single datacenter is depicted in the Figures and described herein, a person skilled in the art will readily recognize that multiple datacenters may be utilized. In one embodiment, clients may be served out of multiple datacenters, but all inbound SMS messages may arrive at a single data center location as the mobile phone company sends all messages destined to a shortcode to a single location. Because data for a given client may not reside in the datacenter to which the message is send, there may be provided a means to look-up clients and forward responses to different datacenters.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for communicating between a plurality of message originators and a plurality of recipients by Short Message Service (SMS) using a shared SMS shortcode, the method comprising:
   adding an originator identifying code to message content of an outbound message, the message content prompting a recipient to respond with response message content that includes the originator identifying code;
   transmitting the outbound message to at least one of the plurality of recipients, a sender identity of the outbound message comprising the shared SMS shortcode;
   receiving an inbound response message from a recipient on the shared SMS shortcode;
   processing content of the inbound response message to extract an originator identifying code; and
   determining an intended originator for the inbound response message from the originator identifying code.

2. The method of claim 1 wherein the outbound message prompts the recipient to respond with an open response content message comprising the originator identifying code as a prefix.

3. The method of claim 1 wherein transmitting the outbound message comprises:
   providing an outbound message request from the originator to a service provider;
   compiling the outbound message by the service provider in response to the outbound message request, compiling the outbound message comprising adding the originator identifying code to message content by the service provider; and
   transmitting the outbound message to the at least one of the recipients in an SMS message from the service provider.

4. The method of claim 3 wherein the service provider processes a message template code of the outbound message request to determine if the outbound message solicits a response and adds the originator identifying code to the message content if the outbound message solicits a response.

5. The method of claim 4 wherein the service provider adds the originator identifying code as a suffix to a solicited response included in the message content of the outbound message.

6. The method of claim 4 comprising storing an association between the originator identifying code and a recipient of the outbound message in a message table.

7. The method of claim 6 comprising using the extracted originator identifying code and a recipient ID of a response message as a lookup to the message table to determine an originator to be associated with the response message.

8. The method of claim 7 comprising storing, by the service provider, at least a portion of the response message content in association with the determined originator.

9. The method of claim 6 comprising:
   determining if a recipient has an existing association stored in the message table; and
   adding an originator identifying code to the message content of the outbound message to the respective recipient only if the recipient has an existing association stored in the message table.

10. The method of claim 3 comprising generating the originator identifying code for a recipient to uniquely identify outbound messages to the respective recipient.

11. A system comprising:
   a service provider that provides outbound SMS messaging services for a plurality of originators using a shared shortcode; and
   one or more originator computer systems programmed to provide an outbound message request to the service provider, the outbound message request comprising a message template identifier;
   wherein the service provider comprises one or more computer systems programmed to:
      receive an outbound SMS message request from one or more of the originators;
      compile an outbound SMS message using a message template associated with the message template identifier of the outbound SMS message request;
      determine from the message template identifier of the outbound message request whether the outbound SMS message associated with the message template identifier solicits a response;
      when the outbound SMS message associated with the message template identifier solicits a response, add an originator identifying code to message content of the outbound SMS message such that the message content prompts a recipient to respond with response message content that includes the originator identifying code; and
      transmitting the outbound message to at least one recipient identified in the outbound message request, wherein a sending identity of a transmitted outbound SMS message is the shared shortcode.

12. The system of claim 11 wherein the one or more computer systems of the service provider are programmed to:
   receive an inbound response message from a recipient on the shared SMS shortcode;
   process content of the inbound response message to extract an originator identifying code; and
   determine an intended originator for the inbound response message from the originator identifying code.

13. The system of claim 12 wherein the one or more computer systems of the service provider are programmed to store an association between the originator identifying code and a recipient of the outbound message in a message table.

14. The system of claim 13 wherein the one or more computer systems of the service provider are programmed to use the extracted originator identifying code and a recipient ID of a response message as a lookup to the message table to determine an originator to be associated with the response message.

15. The system of claim 13 wherein the one or more computer systems of the service provider are programmed to:
   determine if a recipient has an existing association stored in the message table; and
   add an originator identifying code to the message content of the outbound message to the respective recipient only if the recipient has an existing association stored in the message table.

16. The system of claim 11 wherein the one or more computer systems of the service provider are programmed to store at least a portion of the response message content in association with the determined originator.

17. The system of claim 11 wherein the one or more computer systems of the service provider are programmed to compile the outbound SMS message using variable content provided in the outbound SMS message request.

* * * * *